US011867066B2

(12) United States Patent
Maalouf

(10) Patent No.: US 11,867,066 B2
(45) Date of Patent: Jan. 9, 2024

(54) OUTER AIR SEAL WITH KERF SLOTS

(71) Applicant: RTX Corporation, Farmington, CT (US)

(72) Inventor: Fadi S. Maalouf, East Hampton, CT (US)

(73) Assignee: RTX CORPORATION, Farmington, CT (US)

( * ) Notice: Subject to any disclaimer, the term of this patent is extended or adjusted under 35 U.S.C. 154(b) by 100 days.

(21) Appl. No.: 17/469,322

(22) Filed: Sep. 8, 2021

(65) Prior Publication Data

US 2023/0071902 A1 Mar. 9, 2023

(51) Int. Cl.
*F01D 11/08* (2006.01)
*F01D 25/24* (2006.01)

(52) U.S. Cl.
CPC ............ *F01D 11/08* (2013.01); *F01D 25/246* (2013.01); *F05D 2240/11* (2013.01); *F05D 2240/57* (2013.01)

(58) Field of Classification Search
CPC ........ F01D 11/08; F01D 11/24; F01D 11/005; F01D 11/025; F01D 25/243; F01D 25/246; F05D 2240/11; F05D 2300/502
See application file for complete search history.

(56) References Cited

U.S. PATENT DOCUMENTS

| | | | | |
|---|---|---|---|---|
| 5,080,557 A | | 1/1992 | Berger | |
| 5,593,276 A | * | 1/1997 | Proctor | F01D 11/18 415/173.1 |
| 7,094,029 B2 | * | 8/2006 | Taylor | F01D 11/14 415/214.1 |
| 7,958,735 B2 | | 6/2011 | Ellis et al. | |
| 9,879,556 B2 | * | 1/2018 | Chuong | F01D 25/162 |
| 10,132,187 B2 | * | 11/2018 | Tatman | F01D 11/18 |
| 2008/0148737 A1 | | 6/2008 | Ellis et al. | |
| 2015/0345319 A1 | | 12/2015 | Zelesky et al. | |
| 2015/0354386 A1 | | 12/2015 | Chuong et al. | |
| 2017/0248027 A1 | | 8/2017 | Schiavo | |
| 2018/0030844 A1 | | 2/2018 | White et al. | |
| 2018/0340435 A1 | | 11/2018 | Schlemmer et al. | |
| 2020/0025293 A1 | * | 1/2020 | McCaffrey | F16J 15/441 |
| 2021/0148248 A1 | | 5/2021 | Freeman et al. | |

OTHER PUBLICATIONS

Extended European Search Report for EP Application No. 22194701.3, dated Feb. 7, 2023, pp. 1-7.

* cited by examiner

*Primary Examiner* — David E Sosnowski
*Assistant Examiner* — Maxime M Adjagbe
(74) *Attorney, Agent, or Firm* — CANTOR COLBURN LLP

(57) ABSTRACT

Disclosed is an outer air seal, having: an axial member, the axial member extending axially from an axial front end to an axial aft end, and extending radially from a radial inner surface to a radial outer surface; a radial flange extending radially from the radial outer surface of the axial member to a radial outer tip, and extending axially from an axial front surface to an axial aft surface; and a first kerf slot defined through the axial member from the axial front end to the axial aft end and from the radial inner surface to the radial outer surface, and through the radial flange from the axial front surface to the axial aft surface, wherein a radial top end of the first kerf slot is radially spaced apart from the radial outer tip of the radial flange.

14 Claims, 4 Drawing Sheets

OUTER AIR SEAL WITH KERF SLOTS

BACKGROUND

Embodiments of the present disclosure pertain to outer air seals and more specifically to outer air seals with kerf slots.

The performance and operability of a high pressure compressor of a gas turbine engine is dependent on a gap or clearance between the rotor tip and the outer air seal. At the rear stages of the high pressure compressor, such as the seventh and eighth stages, where the air and components are the hottest along the high pressure compressor, the casings and outer air seals may be formed of materials having a high thermal expansion coefficient. The high thermal expansion coefficients in the casings and the outer air seals may cause these structures to grow from exposure to core airflow, which may impact the tip gaps and lead to poor performance. To address this issue, the casings may be formed of materials having a relatively lower thermal expansion coefficient, however it may be desirous to form the outer air seals of materials having a relatively higher thermal expansion coefficient. With this configuration, however, thermal stresses could develop in the outer air seal that could result in structural issues.

BRIEF DESCRIPTION

Disclosed is an outer air seal, including: an axial member, the axial member extending axially from an axial front end to an axial aft end, and extending radially from a radial inner surface to a radial outer surface; a radial flange extending radially from the radial outer surface of the axial member to a radial outer tip, and extending axially from an axial front surface to an axial aft surface; and a first kerf slot defined through the axial member from the axial front end to the axial aft end and from the radial inner surface to the radial outer surface, and through the radial flange from the axial front surface to the axial aft surface, wherein a radial top end of the first kerf slot is radially spaced apart from the radial outer tip of the radial flange.

In addition to one or more of the above disclosed aspects of the seal, or as an alternate, the axial member is a full hoop structure.

In addition to one or more of the above disclosed aspects of the seal, or as an alternate, a flange joint is located at an intersection between the axial member and the radial flange; and the flange joint is located intermediate of the axial front and aft ends of the axial member, whereby the axial member and the radial flange define an inverted T shape.

In addition to one or more of the above disclosed aspects of the seal, or as an alternate, the first kerf slot defines a circumferential gap that is smaller than a thickness of the radial flange.

In addition to one or more of the above disclosed aspects of the seal, or as an alternate, a keyhole is defined at the radial top end of the first kerf slot; and the keyhole has a keyhole diameter that is larger than the circumferential gap.

In addition to one or more of the above disclosed aspects of the seal, or as an alternate, mounting apertures are located in the radial flange, adjacent to the radial outer tip of the radial flange and circumferentially spaced apart from each other by a first circumferential spacing; and each of the mounting apertures has a mounting aperture diameter.

In addition to one or more of the above disclosed aspects of the seal, or as an alternate, the keyhole is radially centered along the radial flange; and the mounting apertures and the keyhole are radially spaced apart by a first radial distance that is greater than the mounting aperture diameter.

In addition to one or more of the above disclosed aspects of the seal, or as an alternate, the seal includes a plurality of kerf slots, including the first kerf slot, wherein the plurality of kerf slots are circumferentially spaced apart from each other along the outer air seal by a second circumferential spacing that is greater than the first circumferential spacing.

In addition to one or more of the above disclosed aspects of the seal, or as an alternate, the axial aft end has a radially extending lip that is configured to seat a w-seal.

In addition to one or more of the above disclosed aspects of the seal, or as an alternate, the axial aft end has an axially extending lip that forms an axial aft seal.

Disclosed is a high pressure compressor of a gas turbine engine, including: a spacer case that supports a seventh stage vane; an outer air seal connected to the spacer case, the outer air seal including: an axial member, the axial member extending axially from an axial front end to an axial aft end, and extending radially from a radial inner surface to a radial outer surface; a radial flange extending radially from the radial outer surface of the axial member to a radial outer tip, and extending axially from an axial front surface to an axial aft surface; and a first kerf slot defined through the axial member from the axial front end to the axial aft end and from the radial inner surface to the radial outer surface, and through the radial flange from the axial front surface to the axial aft surface, wherein a radial top end of the first kerf slot is radially spaced apart from the radial outer tip of the radial flange, wherein: the spacer case is connected to the axial front surface of the radial flange of the outer air seal; the high pressure compressor further includes an aft inner case that is connected to the axial aft surface of the radial flange of the outer air seal; and the outer air seal is formed of a material having a higher thermal expansion coefficient than the spacer case and the aft inner case.

In addition to one or more of the above disclosed aspects of the compressor, or as an alternate, the compressor includes an exit guide vane disposed axially aft of the outer air seal; a w-seal disposed between the exit guide vane and the axial aft end of the axial member of the outer air seal.

In addition to one or more of the above disclosed aspects of the compressor, or as an alternate, the axial member is a full hoop structure.

In addition to one or more of the above disclosed aspects of the compressor, or as an alternate, a flange joint is located at an intersection between the axial member and the radial flange; and the flange joint is located intermediate of the axial front and aft ends of the axial member, whereby the axial member and the radial flange define an inverted T shape.

In addition to one or more of the above disclosed aspects of the compressor, or as an alternate, the first kerf slot defines a circumferential gap that is smaller than a thickness of the radial flange.

In addition to one or more of the above disclosed aspects of the compressor, or as an alternate, a keyhole is defined at the radial top end of the first kerf slot; and the keyhole has a keyhole diameter that is larger than the circumferential gap.

In addition to one or more of the above disclosed aspects of the compressor, or as an alternate, mounting apertures are defined the radial flange, adjacent to the radial outer tip of the radial flange and circumferentially spaced apart from each other by a first circumferential spacing; and each of the mounting apertures has a mounting aperture diameter.

In addition to one or more of the above disclosed aspects of the compressor, or as an alternate, the keyhole is radially centered along the radial flange; and the mounting apertures and the keyhole are radially spaced apart by a first radial distance that is greater than the mounting aperture diameter.

In addition to one or more of the above disclosed aspects of the compressor, or as an alternate, the compressor includes a plurality of kerf slots, including the first kerf slot, wherein the plurality of kerf slots are circumferentially spaced apart from each other along the outer air seal by a second circumferential spacing that is greater than the first circumferential spacing.

Disclosed is a method of distributing thermal energy in a high pressure compressor of a gas turbine engine, including transferring heat energy to an outer air seal of an eighth stage blade via core airflow; and expanding an axial member and a radial flange of the outer air seal from the transferred heat energy, to thereby compress a plurality of kerf slots that are defined along a complete hoop of the outer air seal.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the FIGS.

Figure 1:
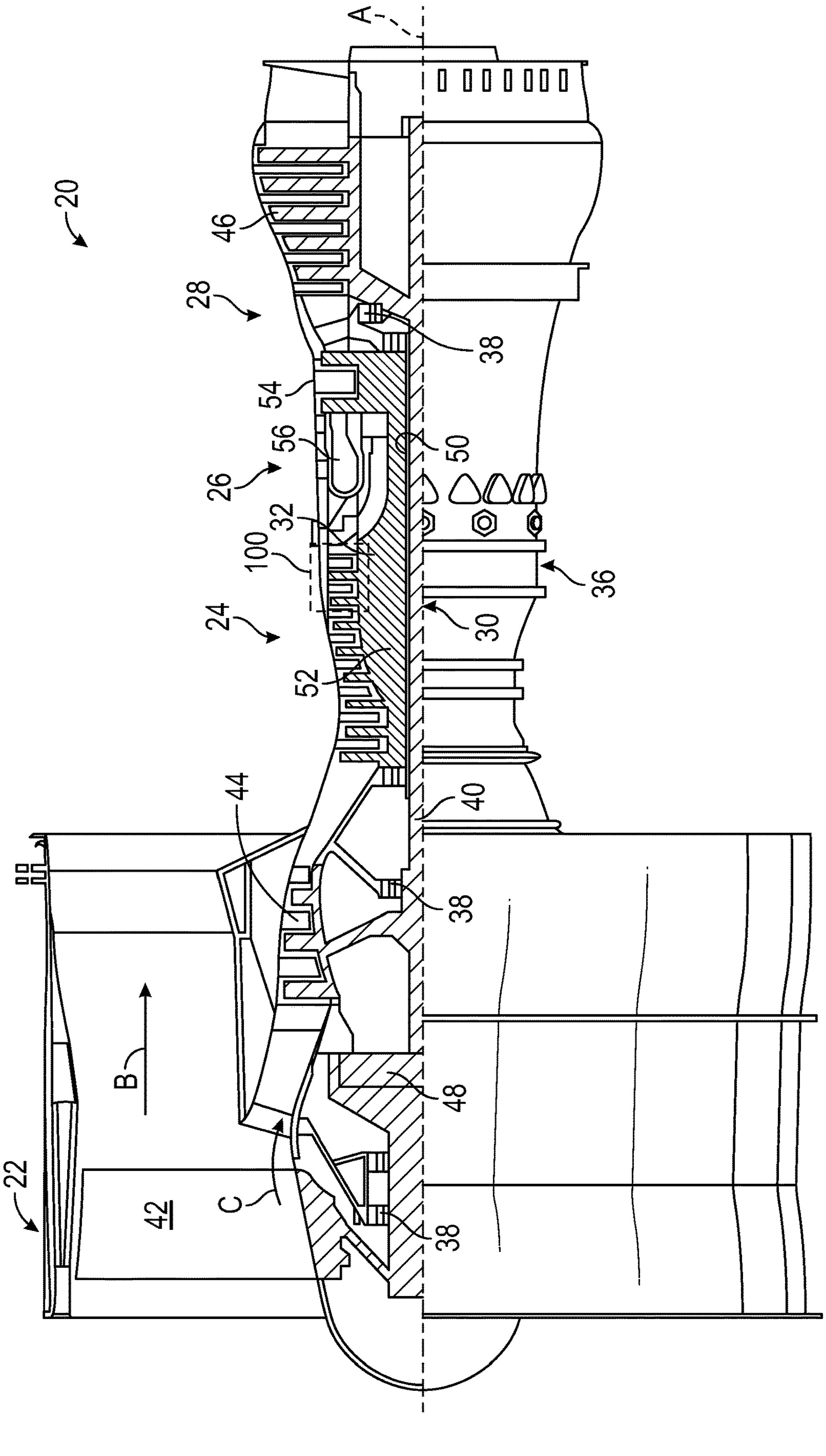
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A (engine radial axis R is also illustrated in FIG. 1) relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft. (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 m/sec).

Figure 2:
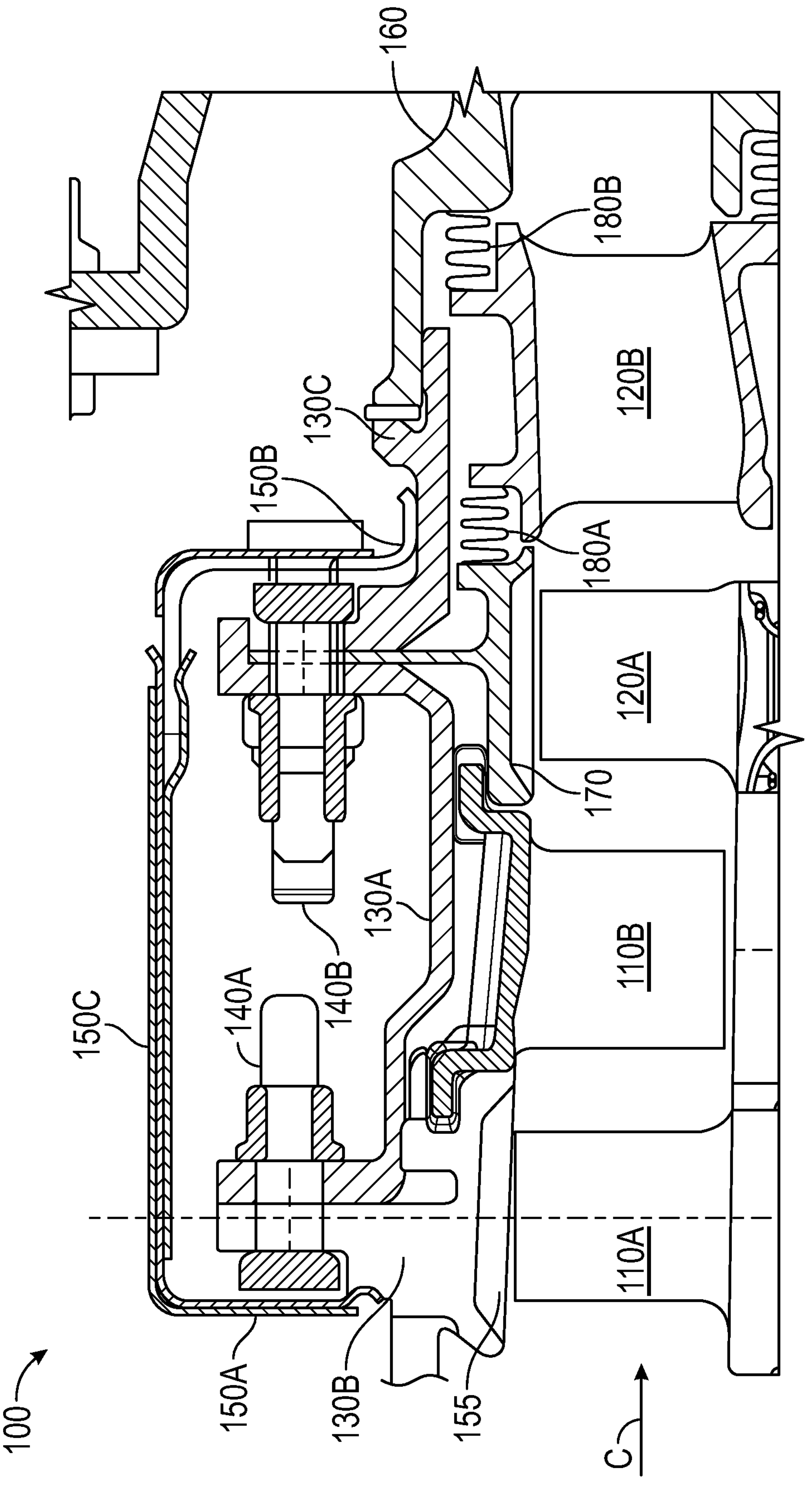
FIG. 2 is a partial cross-sectional view of a high-pressure compressor showing an outer air seal at an eighth stage blade.

Turning to FIG. 2, a section 100 of the high-pressure compressor 52 is shown. The section 100 includes the seventh and eighth stages of the high-pressure compressor 52. Thus FIG. 2 shows the seventh stage blade 110A and vane 110B as well as the eighth stage blade 120A and vane 120B, which is otherwise known as the exit guide vane. It is to be appreciated that reference herein to the seventh and eighth stages of the high-pressure compressor is for exemplary purposes only. The disclosed embodiments are applicable to the aft stages of other configurations of high-pressure compressors, where the stage count may differ from that disclosed herein.

The seventh stage vane 110B is supported by a spacer case 130A. A forward fastener 140A connects the spacer case 130A (cases herein are generally referred to as 130) to a forward heat shield 150A and a forward inner case 130B. The forward inner case 130B includes the seventh stage outer air seal 155.

An aft fastener 140B connects the spacer case 130A to an aft heat shield 150B and an aft inner case 130C. The aft inner case 130C is connected to a diffuser case support 160. An outer heat shield 150C is connected to the spacer case 130A via the forward and aft fasters 140A, 140B. An eighth stage outer air seal 170 (generally referred to as an outer air seal 170) is also supported by the aft fastener 140B, between the spacer case 130A and the aft inner case 130C. A forward w-seal 180A is disposed between the eighth stage vane 120B is and the outer air seal 170. An aft w-seal 180B is disposed between the eighth stage vane 120B and the diffuser case support 160.

Figure 3:
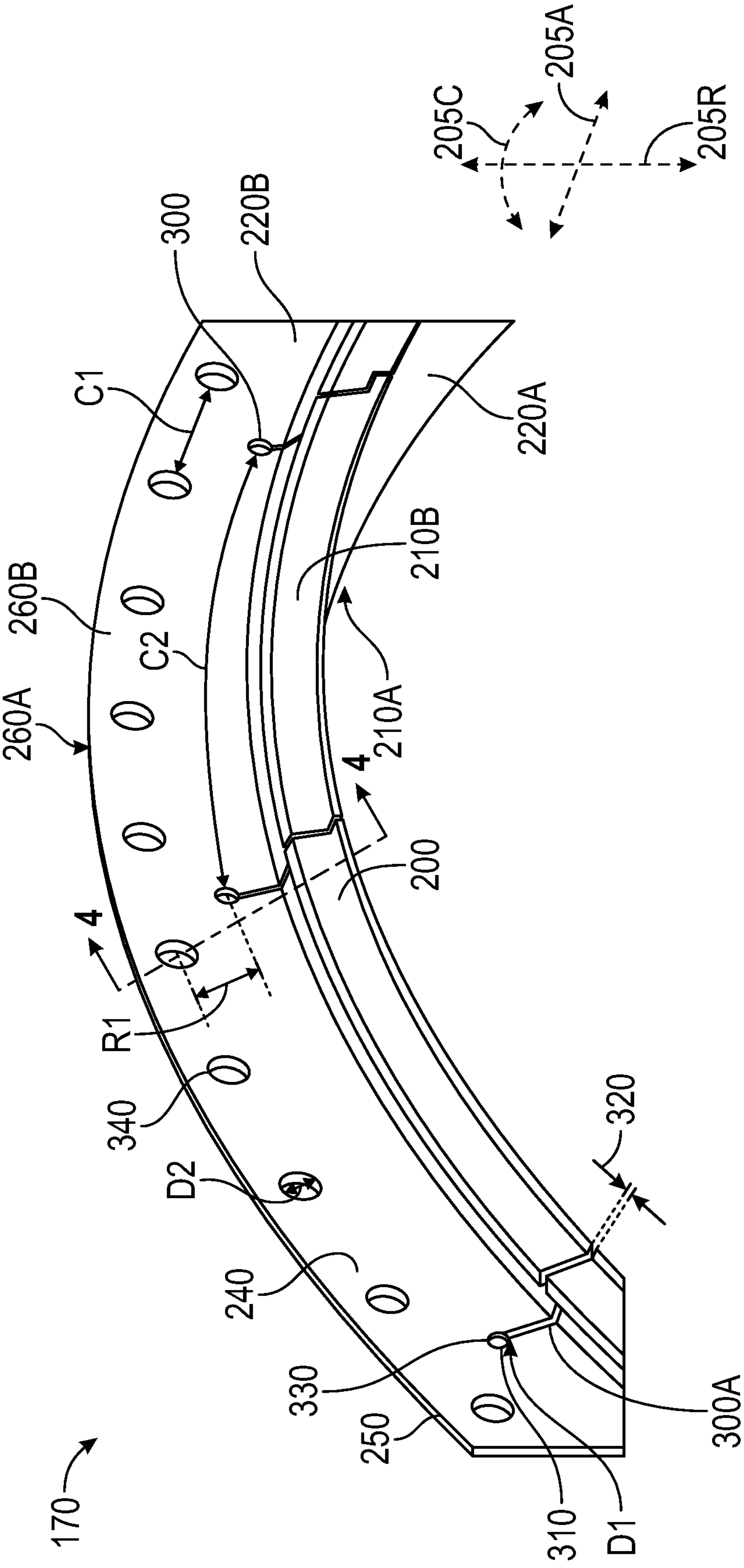
FIG. 3 is a partial perspective view of the outer air seal.
Figure 4:
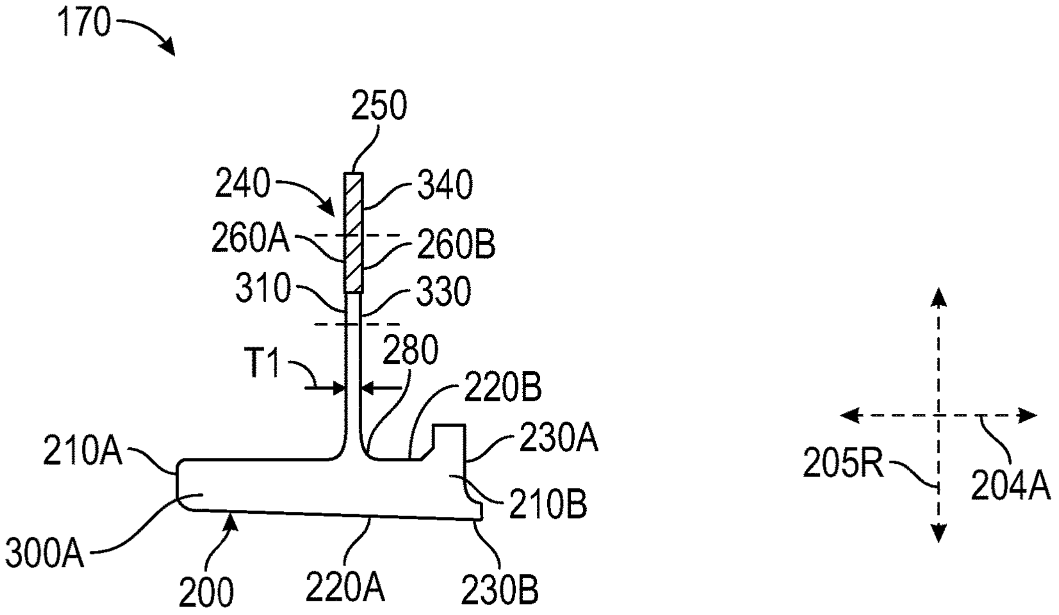
FIG. 4 is a cross-sectional view of the outer air seal along sectional lines 4-4 shown in FIG. 3.

Turning to FIGS. 3 and 4, the outer air seal 170 includes an axial member 200 (e.g., extending in the axial direction 205A). The axial member 200 is a full hoop structure, as are the cases 130 (FIG. 2). The axial member 200 extends axially from an axial front end 210A to an axial aft end 210B. The axial member 200 also extends radially (e.g., in the radial direction 205R) from a radial inner surface 220A to a radial outer surface 220B. The axial aft end has a radially extending lip 230A that is configured to seat the forward w-seal 180A (FIG. 2). The axial aft end 210B has an axially extending lip 230B that forms an axial aft seal (FIG. 2).

A radial flange 240 extends radially from the radial outer surface 220B of the axial member 200 to a radial outer tip 250. The radial flange 240 also extends axially from an axial front surface 260A that faces the spacer case 130A (FIG. 2) to an axial aft surface 260B that faces the aft inner case 130C (FIG. 2). A flange joint 280 (FIG. 4) is located at an intersection between the axial member 200 and the radial flange 240. The flange joint 280 is located intermediate of the axial front and aft ends 210A, 210B of the axial member 200. From this configuration, the axial member 200 and the radial flange 240 together define an inverted T shape.

A first kerf slot 300A is defined through the axial member 200, from the axial front end 210A to the axial aft end 210B and from the radial inner surface 220A to the radial outer surface 220B. The first kerf slot 300A extends through the radial flange 240 from the axial front surface 260A to the axial aft surface 260B. A radial top end 310 of the first kerf slot 300A is radially spaced apart from the radial outer tip 250 of the radial flange 240.

The first kerf slot 300A defines a circumferential gap 320 (FIG. 3) that is smaller than a thickness T1 of the radial flange 240. In one embodiment, the circumferential gap 320 is 0.032 inches wide. A keyhole 330 is defined at the radial top end of the first kerf slot 300A. The keyhole 330 has a keyhole diameter D1 that is larger than the circumferential gap 320 (e.g., in the circumferential direction 205C). The keyhole 330 is radially centered along the radial flange 240. The keyhole 330 prevents the flange from developing a stress induced crack at the top of first kerf slot 300A.

Mounting apertures 340 are located in the radial flange 240. The mounting apertures 340 are adjacent to the radial outer tip 250 of the radial flange 240. The mounting apertures 340 are circumferentially spaced apart from each other by a first circumferential spacing C1 (FIG. 3). Each of the mounting apertures 340 has a mounting aperture diameter D2 (FIG. 3). In one nonlimiting embodiment, the keyhole diameter D1 is smaller than the mounting aperture diameter D2. The mounting apertures 340 and the keyhole 330 are radially spaced apart by a first radial distance R1 (FIG. 3) that is greater than the mounting aperture diameter D2. The relative sizing and spacing of the mounting apertures 340 and first kerf slot 300A prevents weakening of the seal structure from the inclusion of the first kerf slot 300A.

More generally, a plurality of kerf slots, generally labeled 300 (FIG. 3), including the first kerf slot 300A, are provided in the outer air seal 170. The plurality of kerf slots 300 are configured the same as each other. The plurality of kerf slots 300 are circumferentially spaced apart from each other along the outer air seal 170 by a second circumferential spacing C2 that is greater than the first circumferential spacing C1. In one embodiment there are sixteen slots 300. The number of slots 300 enables the outer air seal 170 to flex uniformly from thermal loads induced from the hot core flow.

The outer air seal 170 is formed of a material having a higher thermal expansion coefficient than the cases 130. With this configuration, the outer air seal 170 can circumferentially flex, e.g., expand and contract, when the outer air seal 170 is heated and subsequently cooled from interaction with core air, without transmitting excessive stresses to the attached full-hoop cases 130. Thus the materials selected for the outer air seal 170 and the cases 130 can be optimized for their individual uses rather than accommodating the heat-induced flexing of the outer air seal 170.

Figure 5:
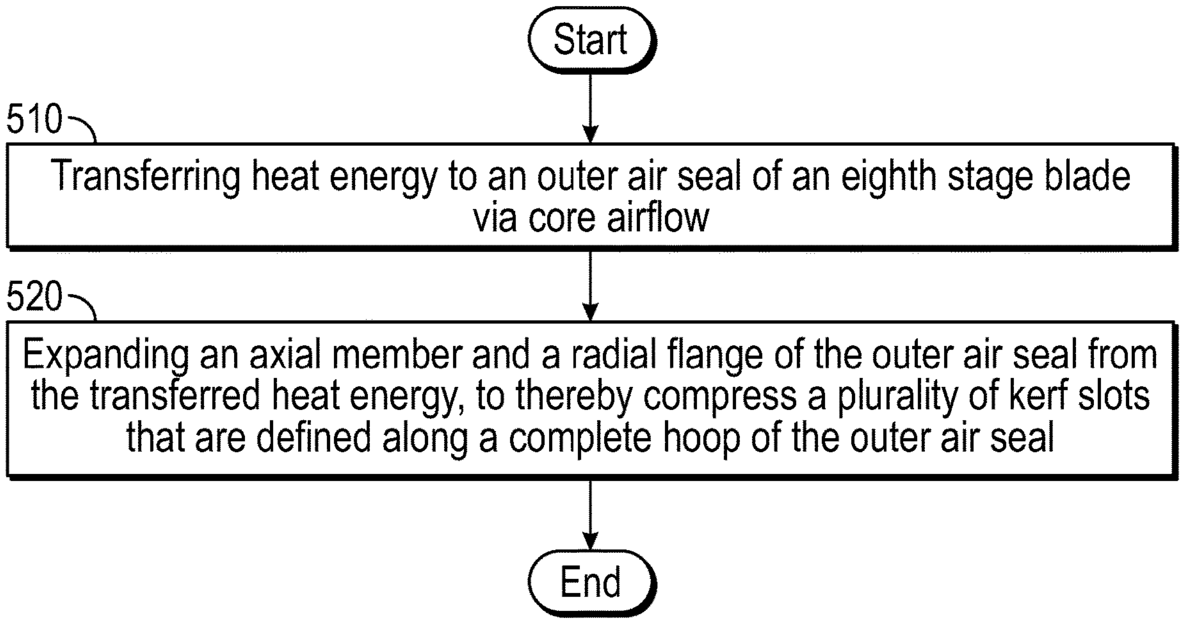
FIG. 5 is a flowchart showing a method of distributing thermal energy in a gas turbine engine.

Turning to FIG. 5, a flowchart shows a method of distributing thermal energy in the high pressure compressor 52 (FIG. 2). As shown in block 510, the method includes transferring heat energy to the outer air seal 170 of the eighth stage blade 120A via core airflow C (FIG. 2). As shown in block 520, the method includes expanding the axial member 200 and the radial flange 240 of the outer air seal 170 from the transferred heat energy (FIGS. 3-4). This configuration compresses the plurality of kerf slots 300 that are defined along a complete hoop of the outer air seal 170.

The embodiments provide an outer air seal for an eighth stage of a gas turbine engine which is formed as a full hoop and defines segmentation cuts in the form of kerf slots on the outer air seal at the flowpath, where temperatures are the hottest. The outer air seal is held by adjacent casings that are also formed as full hoops. These casings are not directly in contact with the hot air in the flowpath and are therefore can be made of materials having a lower coefficient of thermal expansion than the outer air seal. The combination of these full hoop structures, e.g., the outer air seal and the adjacent casings, enables tight tip gaps between the outer air seal and the eighth stage blade. The embodiments therefore improve engine operation and performance.

The terminology used herein is for the purpose of describing particular embodiments only and is not intended to be limiting of the present disclosure. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An outer air seal, comprising:

an axial member, the axial member extending axially from an axial front end to an axial aft end, and extending radially from a radial inner surface to a radial outer surface, the axial aft end has: a radially extending lip that is configured to seat a forward w-seal; and an axially extending lip that forms an axial aft seal;

that is thinner than the axial member and a radial flange extends radially from the radial outer surface of the axial member, from a location intermediate the axial front end and the axial aft end of the axial member to a radial outer tip so that the outer air seal has a T-shaped cross section, and the radial flange extends axially from an axial front surface to an axial aft surface, and mounting apertures are located in the radial flange, adjacent to the radial outer tip of the radial flange and circumferentially spaced apart from each other by a first circumferential spacing; and each of the mounting apertures has a mounting aperture diameter;

a first kerf slot defined through the axial member from the axial front end to the axial aft end and from the radial inner surface to the radial outer surface, and through the radial flange from the axial front surface to the axial aft surface, wherein a radial top end of the first kerf slot is radially spaced apart from the radial outer tip of the radial flange; and a keyhole is defined at the radial top end of the first kerf slot, the keyhole is circular, having a keyhole diameter that is smaller than the mounting aperture diameter, and the keyhole is radially centered along the radial flange, and the mounting apertures and the keyhole are radially spaced apart from each other by a first radial distance that is greater than the mounting aperture diameter.

2. The outer air seal of claim 1, wherein:

the axial member is a full hoop structure.

3. The outer air seal of claim 2, wherein:

a flange joint is located at an intersection between the axial member and the radial flange; and the flange joint is located intermediate of the axial front and aft ends of the axial member, whereby the axial member and the radial flange define an inverted T shape.

4. The outer air seal of claim 3, wherein: the first kerf slot defines a circumferential gap that is smaller than a thickness of the radial flange.

5. The outer air seal of claim 1, comprising:

a plurality of kerf slots, including the first kerf slot, wherein the plurality of kerf slots are circumferentially spaced apart from each other along the outer air seal by a second circumferential spacing that is greater than the first circumferential spacing.

6. The outer air seal of claim 1, wherein:

the axial aft end has a radially extending lip that is configured to seat a w-seal.

7. The outer air seal of claim 1, wherein:

the axial aft end has an axially extending lip that forms an axial aft seal.

8. A method of distributing thermal energy in a high pressure compressor of a gas turbine engine, comprising:

transferring heat energy to an outer air seal of an eighth stage blade via core airflow, wherein the outer air seal is the outer air seal of claim 1; and expanding the axial member and the radial flange of the outer air seal from the transferred heat energy, to thereby compress a plurality of kerf slots, including the first kerf slot, that are defined along a complete hoop of the outer air seal.

9. A high pressure compressor of a gas turbine engine, comprising:

a spacer case that supports a seventh stage vane;

an outer air seal connected to the spacer case, the outer air seal including:

an axial member, the axial member extending axially from an axial front end to an axial aft end, and extending radially from a radial inner surface to a radial outer surface, the axial aft end has: a radially extending lip that is configured to seat a forward w-seal; and an axially extending lip that forms an axial aft seal;

that is thinner than the axial member and a radial flange extends radially from the radial outer surface of the axial member, from a location intermediate the axial front end and the axial aft end of the axial member to a radial outer tip so that the outer air seal has a T-shaped cross section, and the radial flange extends axially from an axial front surface to an axial aft surface, and mounting apertures are located in the radial flange, adjacent to the radial outer tip of the radial flange and circumferentially spaced apart from each other by a first circumferential spacing; and each of the mounting apertures has a mounting aperture diameter;

a first kerf slot defined through the axial member from the axial front end to the axial aft end and from the radial inner surface to the radial outer surface, and through the radial flange from the axial front surface to the axial aft surface, wherein a radial top end of the first kerf slot is radially spaced apart from the radial outer tip of the radial flange; and a keyhole is defined at the radial top end of the first kerf slot, the keyhole is circular, having a keyhole diameter that is smaller than the mounting aperture diameter and the keyhole is radially centered along the radial flange, and the mounting apertures and the keyhole are radially spaced apart from each other by a first radial distance that is greater than the mounting aperture diameter, wherein:

the spacer case is connected to the axial front surface of the radial flange of the outer air seal;

the high pressure compressor further includes an aft inner case that is connected to the axial aft surface of the radial flange of the outer air seal; and the outer air seal is formed of a material having a higher thermal expansion coefficient than the spacer case and the aft inner case.

10. The high pressure compressor of claim 9, comprising:

an exit guide vane disposed axially aft of the outer air seal;

a w-seal disposed between the exit guide vane and the axial aft end of the axial member of the outer air seal.

11. The high pressure compressor of claim 9, wherein:

the axial member is a full hoop structure.

12. The high pressure compressor of claim 11, wherein:

a flange joint is located at an intersection between the axial member and the radial flange; and the flange joint is located intermediate of the axial front and aft ends of the axial member, whereby the axial member and the radial flange define an inverted T shape.

13. The high pressure compressor of claim 12, wherein: the first kerf slot defines a circumferential gap that is smaller than a thickness of the radial flange.

14. The high pressure compressor of claim 9, comprising:

a plurality of kerf slots, including the first kerf slot, wherein the plurality of kerf slots are circumferentially spaced apart from each other along the outer air seal by a second circumferential spacing that is greater than the first circumferential spacing.

* * * * *